United States Patent
Sprunk

(10) Patent No.: US 8,356,314 B2
(45) Date of Patent: Jan. 15, 2013

(54) OBJECT AND RESOURCE SECURITY SYSTEM

(75) Inventor: Eric J. Sprunk, Carlsbad, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 11/250,352

(22) Filed: Oct. 14, 2005

(65) Prior Publication Data

US 2006/0053439 A1  Mar. 9, 2006

Related U.S. Application Data

(63) Continuation of application No. 09/580,303, filed on May 26, 2000, now abandoned.

(51) Int. Cl.
*H04N 7/16* (2011.01)
*H04N 7/167* (2011.01)

(52) U.S. Cl. .......................... 725/28; 380/202

(58) Field of Classification Search ............... 725/28; 380/202

See application file for complete search history.

(56) References Cited

U.S. PATENT DOCUMENTS

| | | | | |
|---|---|---|---|---|
| 4,230,990 A | * | 10/1980 | Lert et al. ...................... | 725/22 |
| 4,685,131 A | * | 8/1987 | Horne ............................ | 380/241 |
| 5,005,200 A | | 4/1991 | Fischer ........................... | 380/30 |
| 5,157,716 A | | 10/1992 | Naddor et al. | |
| 5,166,886 A | * | 11/1992 | Molnar et al. ................. | 700/234 |
| 5,565,909 A | * | 10/1996 | Thibadeau et al. ............. | 725/35 |
| 5,581,270 A | | 12/1996 | Smith et al. | |
| 5,614,940 A | * | 3/1997 | Cobbley et al. ............... | 725/138 |
| 5,619,247 A | | 4/1997 | Russo et al. | |
| 5,619,571 A | * | 4/1997 | Sandstrom et al. ........... | 380/200 |
| 5,654,746 A | | 8/1997 | McMullan et al. | |
| 5,666,293 A | * | 9/1997 | Metz et al. .................... | 709/220 |
| 5,754,646 A | | 5/1998 | Williams et al. | |
| 5,838,790 A | * | 11/1998 | McAuliffe et al. ........... | 713/176 |
| 5,844,986 A | | 12/1998 | Davis ............................ | 380/4 |
| 5,848,397 A | * | 12/1998 | Marsh et al. .................. | 705/14 |
| 5,850,514 A | | 12/1998 | Gonda et al. | |
| 5,857,020 A | | 1/1999 | Peterson et al. | |
| 5,892,904 A | * | 4/1999 | Atkinson et al. ............. | 726/22 |
| 5,912,972 A | | 6/1999 | Barton ........................... | 380/23 |

(Continued)

FOREIGN PATENT DOCUMENTS

EP  0266748  5/1988

(Continued)

OTHER PUBLICATIONS

Hackenberg, Gerald et al. "Computerviren: Vorbeugugn and Bekämfung" IT Informationstechnik, Feb. 1990, vol. 32, No. 1, pp. 58-63, with English translation: "Preventing and combating computer viruses".

(Continued)

*Primary Examiner* — Dominic D Saltarelli
(74) *Attorney, Agent, or Firm* — Stewart M. Wiener

(57) ABSTRACT

A method for securing a plaintext object within a content receiver is described. In one step, a secure portion of a secure object and a plaintext remainder of the secure object are received. Which portion of the secure object is the secure portion is determined. The secure portion is decrypted to provide a plaintext portion. The plaintext object that comprises the plaintext portion and the plaintext remainder is formed. The plaintext object is stored including authentication and authorization.

7 Claims, 13 Drawing Sheets

U.S. PATENT DOCUMENTS

| | | | |
|---|---|---|---|
| 5,933,498 | A | 8/1999 | Schneck et al. |
| 5,951,639 | A * | 9/1999 | MacInnis ................. 725/70 |
| 5,982,891 | A | 11/1999 | Ginter et al. .............. 380/4 |
| 6,028,600 | A * | 2/2000 | Rosin et al. ............. 345/718 |
| 6,157,719 | A | 12/2000 | Wasilewski et al. |
| 6,185,678 | B1 | 2/2001 | Arbaugh et al. |
| 6,256,393 | B1 | 7/2001 | Safadi et al. |
| 6,314,409 | B2 | 11/2001 | Schneck et al. |
| 6,745,245 | B1 | 6/2004 | Carpenter |
| 6,865,675 | B1 | 3/2005 | Epstein |

FOREIGN PATENT DOCUMENTS

| | | |
|---|---|---|
| EP | 0 601 500 A1 | 6/1994 |
| EP | 0 752 786 A | 1/1997 |
| EP | 0 752 786 A1 | 1/1997 |
| EP | 0878706 | 11/1998 |
| EP | 0 909 094 A1 | 4/1999 |
| EP | 0 914 001 A1 | 5/1999 |
| EP | 0 936 813 A1 | 8/1999 |
| EP | 0 946 019 A | 9/1999 |
| EP | 0 946 019 A1 | 9/1999 |
| EP | 0993142 | 9/1999 |
| EP | 1 222 814 A | 7/2001 |
| GB | 2339038 A | 1/2000 |
| WO | 9725798 | 7/1997 |
| WO | WO 98/33325 A2 | 7/1998 |
| WO | WO 98/55910 | 12/1998 |
| WO | WO 98/56180 | 12/1998 |
| WO | WO 99/09743 | 2/1999 |
| WO | WO 99/30217 | 6/1999 |
| WO | WO 99/39504 | 8/1999 |
| WO | WO 99/39504 A | 8/1999 |
| WO | WO 99 53624 | 10/1999 |
| WO | WO 00/04727 | 1/2000 |
| WO | WO 00/04727 A | 1/2000 |
| WO | 0119074 | 3/2001 |
| WO | WO 01/28232 A1 | 4/2001 |

OTHER PUBLICATIONS

Arbaugh, William A., et al., *A Secure and Reliable Bootstrap Architecture*, Proceedings of the IEEE, Dec. 2, 1996, pp. 1-7.

Schneck, Paul B., *Persistent Access Control to Prevent Piracy of Digital Information*, Proceedings of the IEEE, vol. 87, No. 7, Jul. 1999, pp. 1239-1250.

Gerald Hackenberg, *Computerviren: Vorbeugung and Bekampfung*, 258 IT Informationstechnik, 32 (1990) Februar, No. 1, Siemens AG, Munchen.

English translation of above Cite No. BC, 1990.

Olin Sibert et al., "DigiBox: A Self-Protecting Container for Information Commerce," Proceedings of the First USENIX Workshop on Electronic Commerce, New York, Jul. 1995.

InterTrust Technologies Corporation, "A Piece of the Tick. Supporting the Commercial Redistribution of Electronic Information through Value Chains," Oct. 1998.

"Digital Consumer Electronics Handbook," McGraw-Hill, 1997, pp. 17.18-17.25.

"SentinelSuperPro," Rainbow Technologies. Retrieved from the Internet: http://sentinel.rainbow.com, pp. 1-2, 1998.

"iKey," Rainbow Technologies. Retrieved from the Internet: http://ikey.rainbow.com, pp. 1-2, 1998.

Moniea Pawlan et al., "Signed Applets, Browsers, and File Access." Retrieved from the Internet: http://developer.java.sun.com/developer/technicalArticles/Security/Signed/index.html, Apr. 1998.

Monica Pawlan, "Cryptography: The Ancient Art of Secret Messages." Retrieved from the Internet: http://developer.java.sun.com/developer/technicalArticles/Security/Crypto/index.html, Feb. 1998.

Monica Pawlan, "Is the Only Really Secure Computer a Disconnected Computer?" Retrieved from the Internet: http://developer.java.sun.com/developer/technicalArticles/Security/ReallySecure/index.html, Jan. 1998.

Microsoft Corporation, "Microsoft Authenticode Technology. Ensuring Accountability and Authenticity for Software Components on the Internet," Redmond, VA, Oct. 1996.

"Modern Cable Television Technology: Video, Voice, and Data Communications," Morgan Kaufmann Publishers, Inc., San Francisco, CA, 1999, pp. 743-751.

Dan S. Wallach et al., "Extensible Security Architectures for Java," BNS Document ID XP-002101681, 1997, pp. 1-26.

Charles Crichton et al., "When to trust mobile objects: access control in the Jini™ Software System," BNS Document ID XP-002155686, 1999. pp. 116-125.

The Trusted Computing Platform Alliance, "Building a Foundation of Trust in the PC", Jan. 2000.

PCT International Search Report for PCT/US00/27632, dated Jan. 12, 2001.

PCT International Search Report for PCT/US01/14392, dated Jan. 22, 2002.

PCT International Search Report for PCT/US01/14261, dated Jan. 16, 2002.

PCT International Search Report for PCT/US01/14390, dated Jan. 29, 2002.

PCT International Search Report for PCT/US01/14282, dated Jan. 16, 2002.

* cited by examiner

OBJECT AND RESOURCE SECURITY SYSTEM

This application is a continuation of patent application Ser. No. 09/580,303 filed on May 26, 2000 now abandoned.

BACKGROUND OF THE INVENTION

This invention relates in general to secure access systems and, more specifically, to securing information.

Cable television (TV) providers distribute video streams to subscribers by way of conditional access (CA) systems. CA systems distribute video streams from a headend of the cable TV provider to a set top box associated with a subscriber. The headend includes hardware that receives the video streams and distributes them to the set top boxes within the CA system. Select set top boxes are allowed to decode certain video streams according to entitlement information sent by the cable TV provider to the set top box. In a similar way, other video program providers use satellite dishes to wirelessly distribute video content to set top boxes.

Video programs are broadcast to all set top boxes, but only a subset of those boxes are given access to specific video programs. For example, only those that have ordered a pay per view boxing match are allowed to view it even though every set top box may receive encrypted data stream for the match. Once a user orders the pay per view program, an entitlement message is broadcast in encrypted form to all set top boxes. Only the particular set top box the entitlement message is intended for can decrypt it. Inside the decrypted entitlement message is a key that will decrypt the pay per view program. With that key, the set top box decrypts the pay per view program as it is received in real-time. Some systems sign entitlement messages.

Only recently has storage of multiple hours of video become practical. Each video program is transmitted to set top boxes as a compressed MPEG2 data stream. One hour of video corresponds to about one gigabyte of compressed data. Since multigigabyte storage is common today, multiple hours of video can now be stored. In contrast, conventional CA systems presume content is ephemeral and cannot be stored. In other words, conventional systems are designed presuming that the video programs were too large to retain them for any period of time. As those skilled in the art can appreciate, the ability to store multigigabyte video programs spawns a need for additional security measures in CA systems.

Some systems integrate personal computing with a TV to display content. Products such as WebTV™ integrate web browsing and e-mail features with a TV. In other systems, a personal computer (PC) is connected to an Internet service provider (ISP) that provides the content for the web browsing and e-mail features, Software programs, such as the e-mail program, tend to be small and easily stored. Those skilled in the art recognize that these PC do not provide adequate security such that they are susceptible to viruses and hackers.

As described above, conventional CA systems only check entitlement of video streams. With advent of larger storage and smaller Internet related programs, content can be stored and reside with the user for an indefinite period of time. To maintain control over this content, additional security measures are needed.

SUMMARY OF THE INVENTION

According to the invention, object and resource security are provided in a conditional access system. Authentication and/or authorization checks are performed at a number of checkpoints to assure security of the object and resource. Checkpoints trigger these checks when the purpose of the object or' resource becomes manifest as well as other times during handling of the object or resource.

In a particular' embodiment, a process for securing information is disclosed. After receiving information, that information is authenticated a first time. The information is also authorized and stored. At some point, the information is authenticated a second time.

In another embodiment, a content delivery system is disclosed that includes a memory, a network port and a number of checkpoints. Content is received by a network port and retained in the memory. Each piece of content is subject to at least two checkpoints.

In yet another embodiment, a method for authenticating and authorizing information is disclosed. After receiving information, it is authenticated and authorized. A process is run that checks either authentication or authorization once again.

In still another embodiment, a method for authenticating and authorizing content supplied to a conditional access set top box is disclosed. Content is received in the conditional access set top box. The content is authenticated a first time within the conditional access set top box. When the content is accessed within the set top box, the content is authenticated a second time.

The invention will be better understood by reference to the following detailed description in connection with the accompanying drawings.

DESCRIPTION OF THE SPECIFIC EMBODIMENTS

The present invention authenticates and authorizes information in a television set top box throughout the lifetime of the information, Increases in the size of storage media and decreases in the size of new types of content necessitate new security measures to authenticate the source of the information and authorize the use of the information.

In the Figures, similar components and/or features have the same reference label. Further, various components of the same type are distinguished by following the reference label by a dash and a second label that distinguishes among the similar components. If only the first reference label is used in the specification, the description is applicable to any one of the several similar components having the second label.

Figure 1:
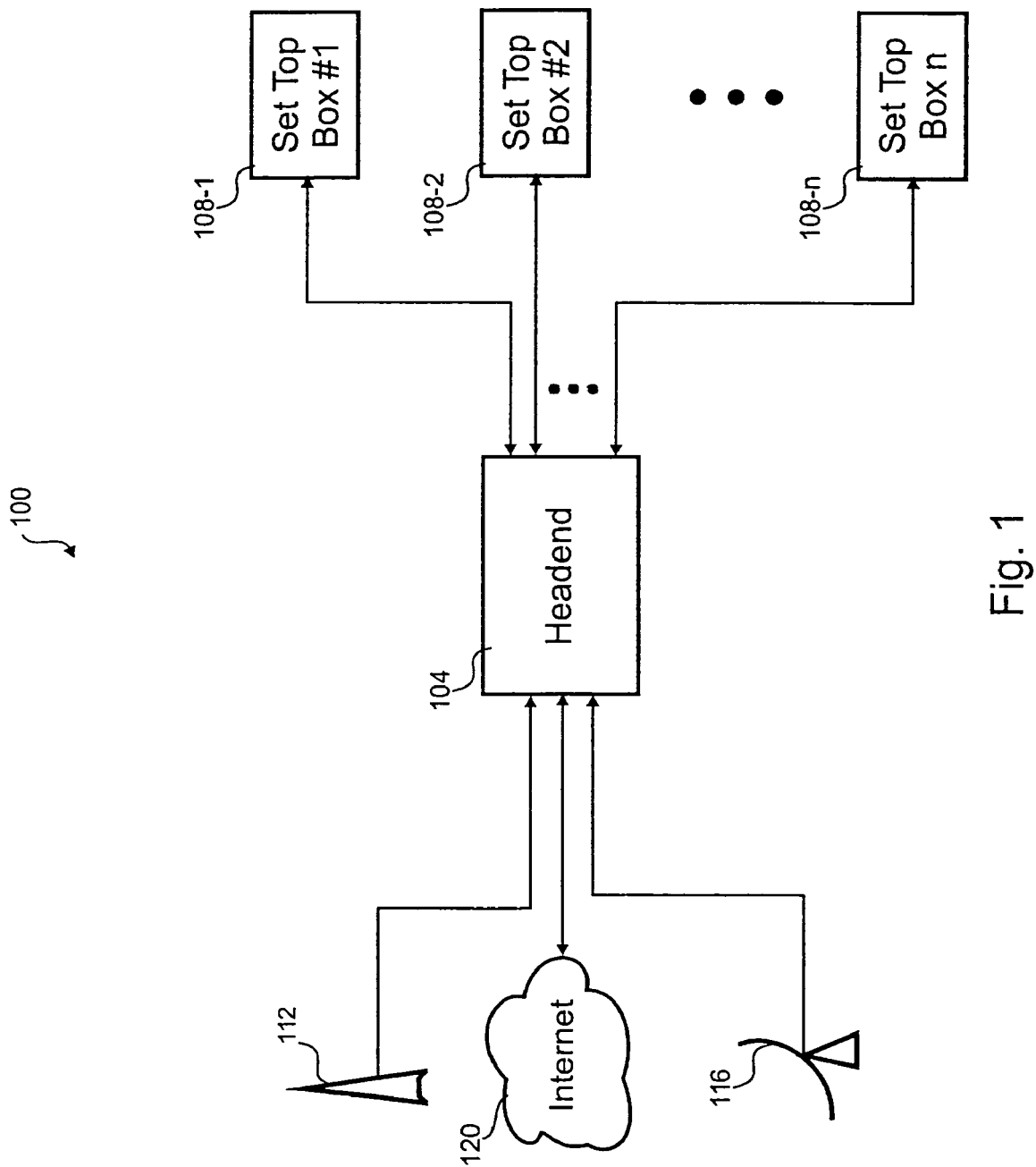
FIG. 1 is a block diagram showing one embodiment of a content delivery system.

Referring first to FIG. 1, a block diagram of one embodiment of a content delivery system 100 is shown. The delivery system 100 selectively provides content to a number of users based upon certain conditions being satisfied. Included in the system 100 are a headend 104, number of set top boxes 108, local programming receiver 112, satellite dish 116, and the Internet 120.

The headend 104 receives content and distributes that content to users. Content can include video, audio, interactive video, software, firmware, and/or data. This content is received from a variety of sources that include the satellite dish 116, local programming receiver 112, microwave receivers, packet switched networks, Internet 120, etc. Each set top box 108 has a unique address that allows sending entitlement information to an individual set top box 108. In this way, one set top box 108-1 might be entitled to some particular content while another 108-2 might not. Equipment within the headend 104 regulates which set top boxes 108 are entitled to that content.

The content is generally distributed in digital form through an analog carrier channel that contains multiple content streams. All the content streams are multiplexed together into a digital stream that is modulated upon the analog carrier channel. The separate content streams are separated by packet identification (PID) information such that the individual content streams can be removed according to their unique PD information. There are around one hundred and twenty analog carrier channels in this embodiment of the system 100. Other embodiments could distribute the content with satellite dishes, microwave antennas, RF transmitters, packet switched networks, cellular data modems, carrier current, phone lines, or the Internet.

Figure 2:
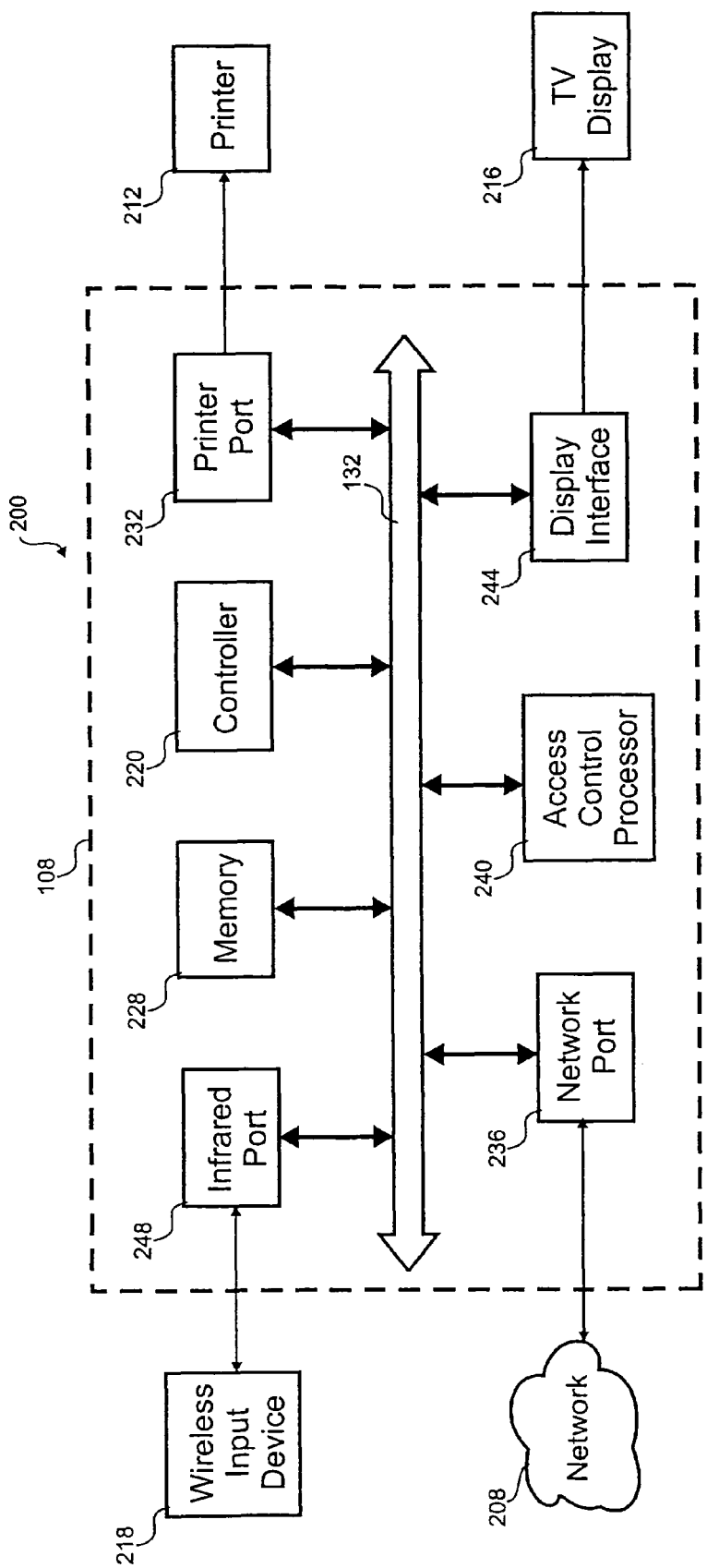
FIG. 2 is a block diagram illustrating an embodiment of a set top box interfaced to its environment.

Referring next to FIG. 2, a block diagram of an embodiment of a display system 200 is shown. This embodiment provides multiple levels of object and resource security through a variety of security levels. Included in the display system 200 are a set top box 108, network 208, printer 212, TV display 216, and wireless input device 218. These items cooperate in such a way that the user can enjoy content provided from a 10 content provider. The content can be video, audio, software, firmware, interactive TV, data, or other information. In this embodiment, the content provider is a cable TV provider.

The network 208 serves as the conduit for information traveling between the set top box 108 and the headend 104 of the cable TV provider. In this embodiment, the network has one hundred and twenty analog channels and a bi-directional control data channel. Generally, the analog channels carry content and the control data channel carries control and entitlement information. Each analog carrier channel has a number of digital channels multiplexed into one data stream where the digital channels are distinguished by packet identifiers (PIDs). The bi-directional control channel is out-of-band channel that broadcasts data to the set top boxes 108 at one frequency and receives data from the boxes 108 at another frequency. Return data may be queued to decrease overloading during peak use periods using a store and forward methodology well known in the art. Other embodiments could use a cable modem or digital subscriber line (DSL) for both control information and content where the content is formatted as packet switched data.

The printer 212 is an optional accessory some users may purchase and add to their display system 200. When using the set top box 108 for personal computer tasks, the printer 212 allows printing data such as email, web pages, billing information, etc. As will be explained further below, the ability to use a peripheral like a printer is regulated by an authorization check. Using the regulation feature, printers 212 compatible with the set top box 108 do not work unless proper authorization is obtained.

The TV display 216 presents the user with audio and/or video corresponding to the content. The display 216 typically receives an analog video signal that is modulated on a carrier corresponding to channel three, channel four or a composite channel. The set top box 108 produces a NISC signal, for example, modulated to the appropriate channel. Other embodiments could use a video monitor or digital display instead of a television display 216. Use of a digital display would alleviate the need for an analog conversion by the set top box 108 because digital displays, such as liquid crystal displays, use digital information to formulate the displayed picture.

The wireless input device 218 allows interaction between the user and the set top box 108. This device 218 could be a remote control, mouse, keyboard, game controller, pen tablet or other input mechanism. An infrared transceiver on the input device 218 communicates with a similar transceiver on the set top box 108 to allow wireless communication. In other embodiments, RF link or wired link could be used instead of the infrared transceiver.

The set top box 108 has component parts that perform authentication and authorization of objects and resources. Objects are any collection of digital information such as software, drivers, firmware, data, video, or audio. Resources are anything needed by an object to operate as intended such as another object or a physical device, Included in the set top box 108 are a controller 220, memory 228, a printer port 232, a network port 236, an access control processor 240, a display interface 244, and an infrared (IR) port 248. These blocks communicate with each other over a bus 132 where each block has a different address to uniquely identify it on the bus 132.

The controller 220 manages operation of the set top box 108 using a trusted or secure operating system. Such functions as digital object decryption and decompression are performed in the controller 220 as well as functions such as switching TV channels for the user and presenting menus to the user. Included in the controller are a processor, an encryption engine, local memory, and other items common in computing systems.

In other embodiments, the controller 220 could also contain an adjunct secure microprocessor for purposes of key protection or cryptographic processing. This may be appropriate in some systems where a high level of security is desired.

The set top box 108 includes a block of memory 228. This memory 228 is solid state memory that could include RAM, ROM, flash, and other types of volatile and non-volatile memory. Objects and resources are stored in memory for running at a later time. During execution, programs are loaded into and executed within the memory 228, and also use the memory 228 for scratchpad space. Keys, serial numbers and authorizations can be stored in non-volatile flash memory.

This embodiment includes a printer port 232 for interfacing to an optional printer 212. The printer port 232 resource is not available to programs unless authorized. As explained further below, each object must have authorization to use a resource such as the printer port 232. Data is sent from the printer port 232 to the printer 212 in a serial or parallel fashion by way of a wired or wireless transport mechanism.

Stated generally, a checkpoint is a point in time or a step of processing where the authentication and/or authorization status of an object is confirmed. A checkpoint is encountered when printing is requested. The checkpoint authorizes and authenticates the object requesting the printing. Checkpoints are places in one object where authentication and/or authorization are run on another object (e.g., an operating system checks authentication and authorization of an application that is running). Ideally, checkpoints are performed when the purpose of the object becomes manifest. In the case of a printer port 232, its purpose becomes manifest when it is used to print something. Accordingly, a checkpoint is triggered to check the object using the printer port 232 resource when anything is printed. Typically, the checkpoint for printing would be in the operating system.

The network port 236 allows bi-directional communication between the set top box 108 and the headend 104. Included in the network port 236 are a timer and a demodulator that tune to analog carrier channels and demodulate an MPEG data stream to allow one-way delivery of content. Also included in the network port 236 are a control data transceiver or cable modem that allows for bi-directional communication of control data information and/or content. To distribute loading of the control data path to the headend 104 more evenly, a store and forward methodology may be used.

Modulation of the digital video signal onto an analog signal compatible with the TV display 216 is performed by the display interface 244. As discussed above, the TV display 216 generally accepts signals modulated on channel three, channel four or a composite channel. For displays that accept a digital input, such as LCD displays, the display interface 244 performs any formatting required by the digital input.

The IR port 248 communicates bi-directionally with a wireless input device 218. Included in the IR port 248 is an IR transceiver that provides the wireless communication path with the input device 218. Other electronics in the IR port 248 convert analog signals received by the transceiver to a corresponding digital signal and convert analog signals sent to the transceiver from a corresponding digital signal. The controller 220 processed the digital signals so that the user can control some of the functions within the set top box 108.

The access control processor (ACP) 240 regulates security functions within the set top box 108. For example, the ACP 240 performs authentication and authorization either under the direction of the controller 220 or independent of the controller 220 as will become clear in the discussion below. To perform its tasks, the ACP 240 includes a processor, RAM and ROM that cooperate to execute software independent of the controller 220. The ACP 240 also includes a decryption engine and a hash function for deciphering content and calculating signatures. In some embodiments, checkpoints are embedded into the software run on the controller 220 that trigger the ACP 240 to perform security checks.

The ACP 240 can also shadow the operating system (OS) to assure proper functioning of the OS. By watching the launch of objects, the ACP 240 can monitor which application objects are running. If necessary, the ACP 240 can kill running applications if a checkpoint detects an error or if authorization expires. Further, the ACP 240 could monitor memory 228 to detect any application not authorized to be in memory 228. Scratchpad memory size could also be monitored to detect applications hiding in scratchpad memory. Additionally, the ACP 240 could randomly execute checkpoints on the objects in memory to confirm their authorization anchor authenticity. Problems encountered by the ACP 240 are reported to either the OS or the headend 104. In these ways, the ACP 240 acts as a software security guard bot within the set top box 108 such that aberrant behavior is detected and reported.

Depending on the features desired and the security needed in the set top box 108, different levels of security are activated in the content delivery system 100. In a first level of security, objects are sent to the set top box 108 by way of the network 208 in encrypted form. An entitlement message that contains the decryption key is sent to the set top box 108. With the decryption key, the set top box 108 can decrypt and use the object.

Figure 3:
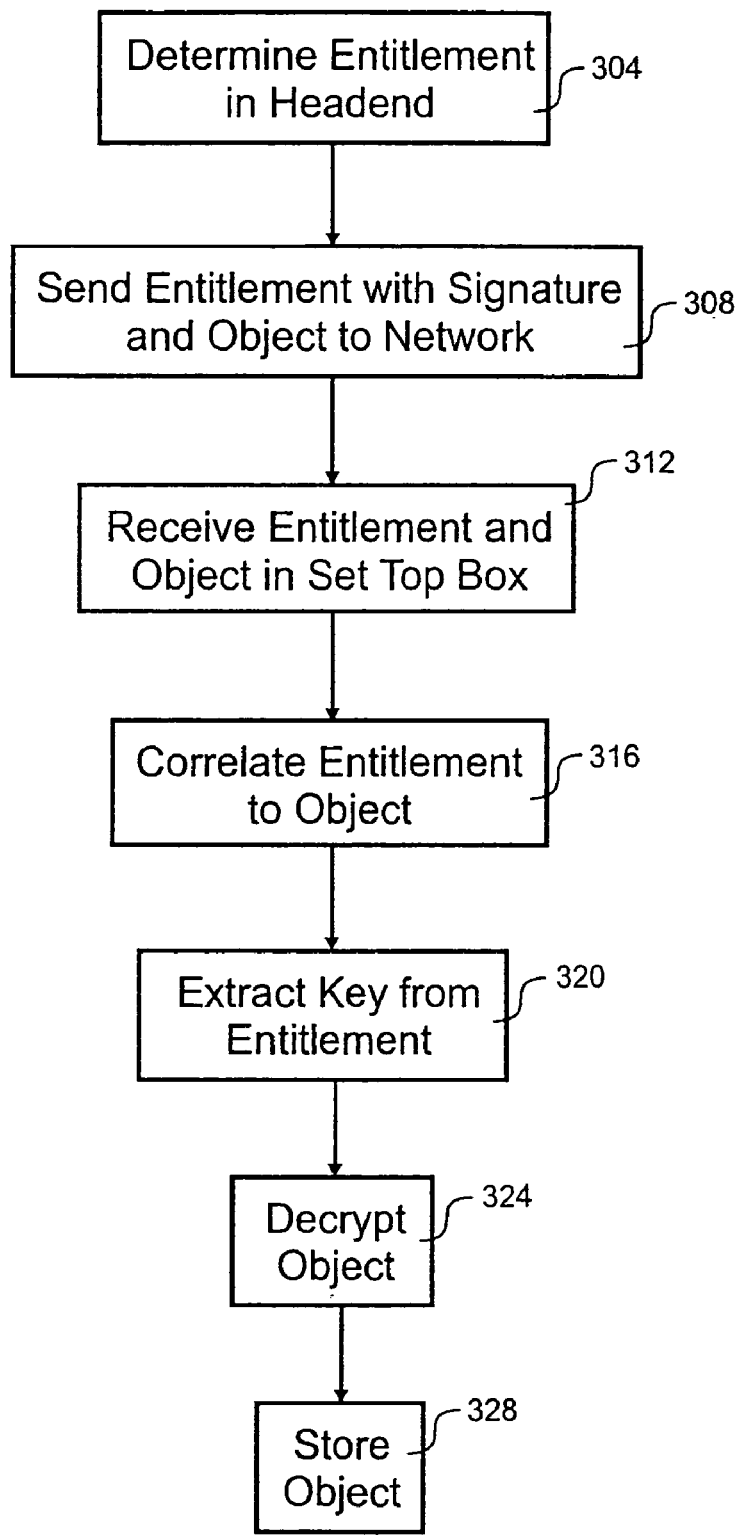
FIG. 3 is a flow diagram showing an embodiment of a process for distributing an object in a first security level.

Referring next to FIG. 3, a flow diagram of an embodiment of a process for distributing an object in the first security level is shown. The process begins in step 304 where an entitlement message is formulated in the headend 104. Included in the entitlement message is a key that can decrypt the associated object. In step 308, the entitlement message and object are sent over the network 208 to the set top box 108. After receipt of the entitlement message and object, they are correlated together in step 316. The key is extracted from the entitlement message and used to decrypt the object before it is written to the memory 228 in steps 320, 324 and 328. This process provides both authentication and authorization of the object by using encryption.

Figure 4:
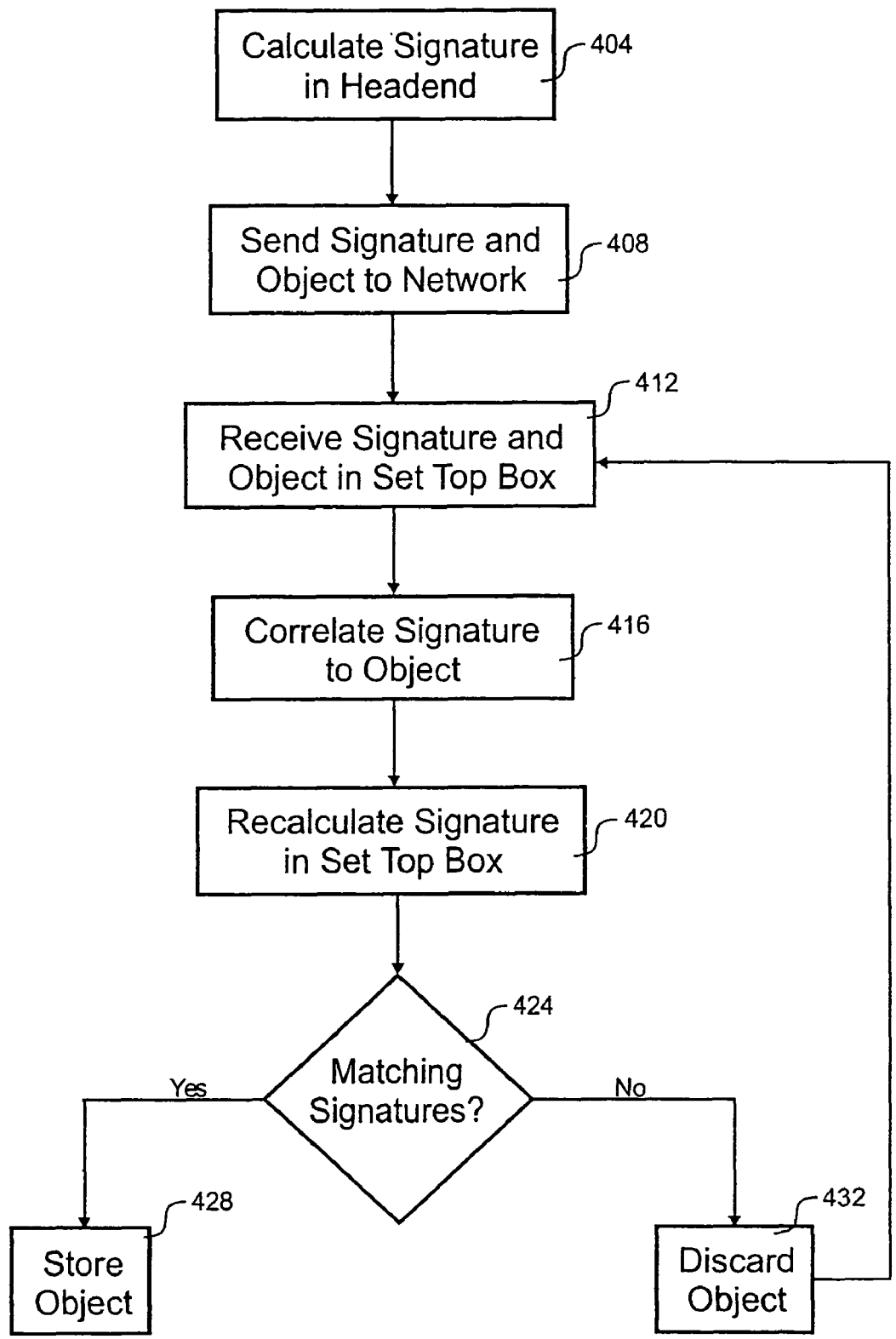
FIG. 4 is a flow diagram showing an embodiment of a process for distributing an object in a second security level.

Referring next to FIG. 4, a flow diagram of an embodiment of a process for distributing an object in a second security level is shown. In the second level of security, signatures are used to authenticate an object upon download. In other words, the second level of security imposes a checkpoint on the object when downloaded. The signature is generated over a signatory group that includes portions of an authorization message and object message in the headend 104 in step 404. The authorization message is metadata related to the object message and the object message contains the object intended for the set top box 108.

In step 408, the signature in the authorization message and the object are separately sent to the set top box 108 over the network 208. Preferably an asymmetric signature is used (e.g., RSA, DSA or ECC based), but a symmetric signature (e.g., DES or triple-DES) could also be used. Upon receipt of the signature and the object and before storing the object, the signature is calculated and checked by the ACP 240 in steps 420 and 424. If the calculated and received signatures match, the object is stored in step 428. Alternatively, the object is discarded in step 432 if there is no match, and processing loops back to step 412 to wait for another copy of the object.

Figure 5:
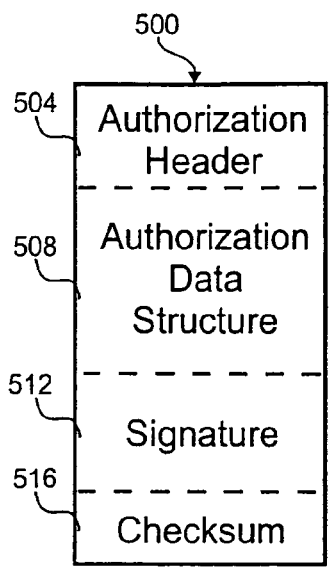
FIG. 5 is a block diagram depicting an embodiment of an authorization message.
Figure 6:
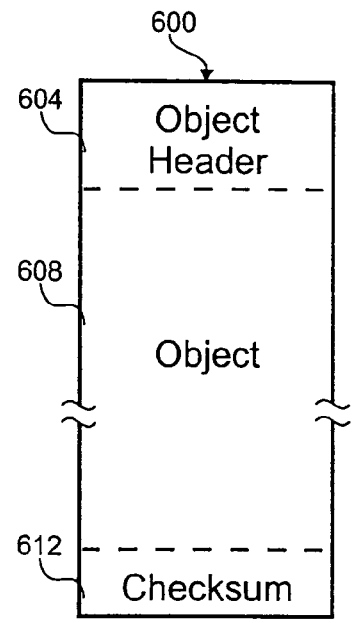
FIG. 6 is a block diagram showing an embodiment of an object message.
Figure 7:
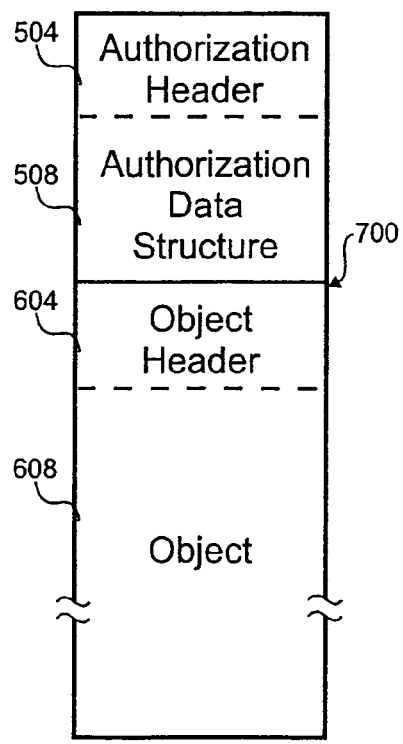
FIG. 7 is a block diagram illustrating an embodiment of a signatory group that includes portions of the authorization message and the object message.

With reference to FIGS. 5-7, an authorization message 500, an object message 600 and a signatory group 700 are respectively shown in block diagram form. Included in the authorization message 500 of FIG. 5 are an authorization header 504, an authorization data structure 508, a signature 512, and a first checksum 516. The authorization message 500 has information used to both authenticate and authorize the object message 600. Forming the object message of FIG. 6 are an object header 604, an object 608 and a second checksum 612. The object message 600 serves as the transport for the object 608. The signatory group 700 includes components of the authorization message 500 and object message 600 arranged end-to-end. The signature 512 is calculated over the whole signatory group 700. More specifically, the signatory group 700 of FIG. 7 includes the authorization header 504, authorization data structure 508, object header 604, and object 608.

The authorization header 504 indicates the configuration of the authorization message 500. Included in the header 504 are a subtype identifier and message version. The subtype identifier distinguishes the various types of authorization messages 500 from one another. In this embodiment, there are authorization message subtypes corresponding to objects and resources. Object subtypes have a corresponding object message 600, but resource subtypes do not. Accordingly, the subtype identifier is used to determine if there is an object message 600 associated with an authorization message 500. There maybe several types of object subtypes and resource subtypes for a given system and the message version allows distinguishing the various types.

The authorization data structure 508 provides authorization information to the set top box 108. In the case of an authorization message subtype corresponding to an object, the authorization data structure 508 contains an object identifier, a software version, cost information, entitlement information, lifetime information, and one or more program tiers. The object identifier is unique for each object 608 and allows attributing an authorization message 500 to its corresponding object message 600. Version information is included in the data structure 508 to indicate the version of the object 608.

Portions of the authorization data structure 508 are used to determine availability of the object 608 to the set top box 108. The cost information indicates to the set top box 108, and sometimes the user, the price associated with the object 608. Entitlement information is used to determine if the particular set top box 108 is authorized to accept the object 608. The entitlement information may include a key if the object 608 is encrypted with a symmetric key. If the set top box 108 is not authorized for the object, there is no need to process the corresponding object 608 when it is received. Lifetime information allows the expiration of the authorization of the object 608 to prevent use after a certain date or time. Programming tiers are used to restrict authorization of objects 608 to predefined tiers such that a set top box 108 can only access objects 608 within a predetermined tier.

The signature 512 is used to verify that portions of both the authorization message 500 and corresponding object message 600 are authentic, A hash function such as SHA-1 or MD5 is run over the whole signatory group, where after the result is run through a signing algorithm such as RSA to produce the signature. Alternatively, a simple CRC algorithm could be used for the hash function, where after the result could be sent through an encryption algorithm such as or triple-DES and DES to produce the signature. When compiling the authorization message 500, the headend 104 calculates the signature 512 over the whole signatory group 700 before inserting the signature 512 into the authorization message 500. The set top box 108 calculates the signature of the signatory group 700 upon receipt of both the authorization and object messages 500, 600. Once the signature is calculated, it is checked against the received signature to authenticate portions of both the authorization and object messages 500, 600. If the signatures do not match, the set top box 108 discards the object message 600 because it presumably came from an improper source.

The first and second checksums 516, 612 are calculated with either linear or non-linear algorithms. These checksums 516, 612 verify the error integrity of the data as it is transported to the set top box 108 over the network 208. For example, the checksum could be a cyclic redundancy check (CRC). The message spooler 208 calculates the checksum 516 as the message 500 is being sent and appends the checksum 516 onto the end of the message 500. Conversely, the set top box 108 calculates the checksum as the message 500 is received and checks the calculated checksum against the checksum 516 in the received message 500. If the calculated and received checksums do not match, an error in transmission has occurred. Messages 500, 600 with errors are discarded where after the headend 104 may send replacement messages 500, 600.

The object header 604 includes attributes for the object message 600. Included in the object header 604 are a header length, an object length, the object identifier, the software version, and a domain identifier. The header length and object length respectively indicate the lengths of the object header 604 and the object 608. As described above, the object identifier provides a unique code that allows attributing the authorization message 500 to the object message 600. The software version indicates the version of the object. Different cable TV providers are assigned domain identifiers such that all of the set top boxes 108, which might receive an object 608, can screen for objects 608 associated with their domain.

The object 608 includes content the system 100 is designed to deliver to set top boxes 108. Several types of information can be embedded in an object, such as executable programs, firmware upgrades, run-time programs (e.g., Java® or ActiveX®), programming schedules, billing information, video, audio, or data. The object 608 can be used immediately after authentication and authorization or at a later time. Additionally, authorization can be programmed to expire after a certain amount of time.

Referring specifically to FIG. 7, the signatory group 700 is shown. This group 700 is comprised of parts of both the authorization message 500 and the object message 600. All the data used to calculate the signature 512 is included in the signatory group 700. Because the signature requires components from both the authorization message 500 and object message 600, a failed signature check indicates one of the authorization message 500 and the software message 600 cannot be verified as originating from a trusted source. The trusted source is the cable TV provider that generated the signature 512.

Figure 8:
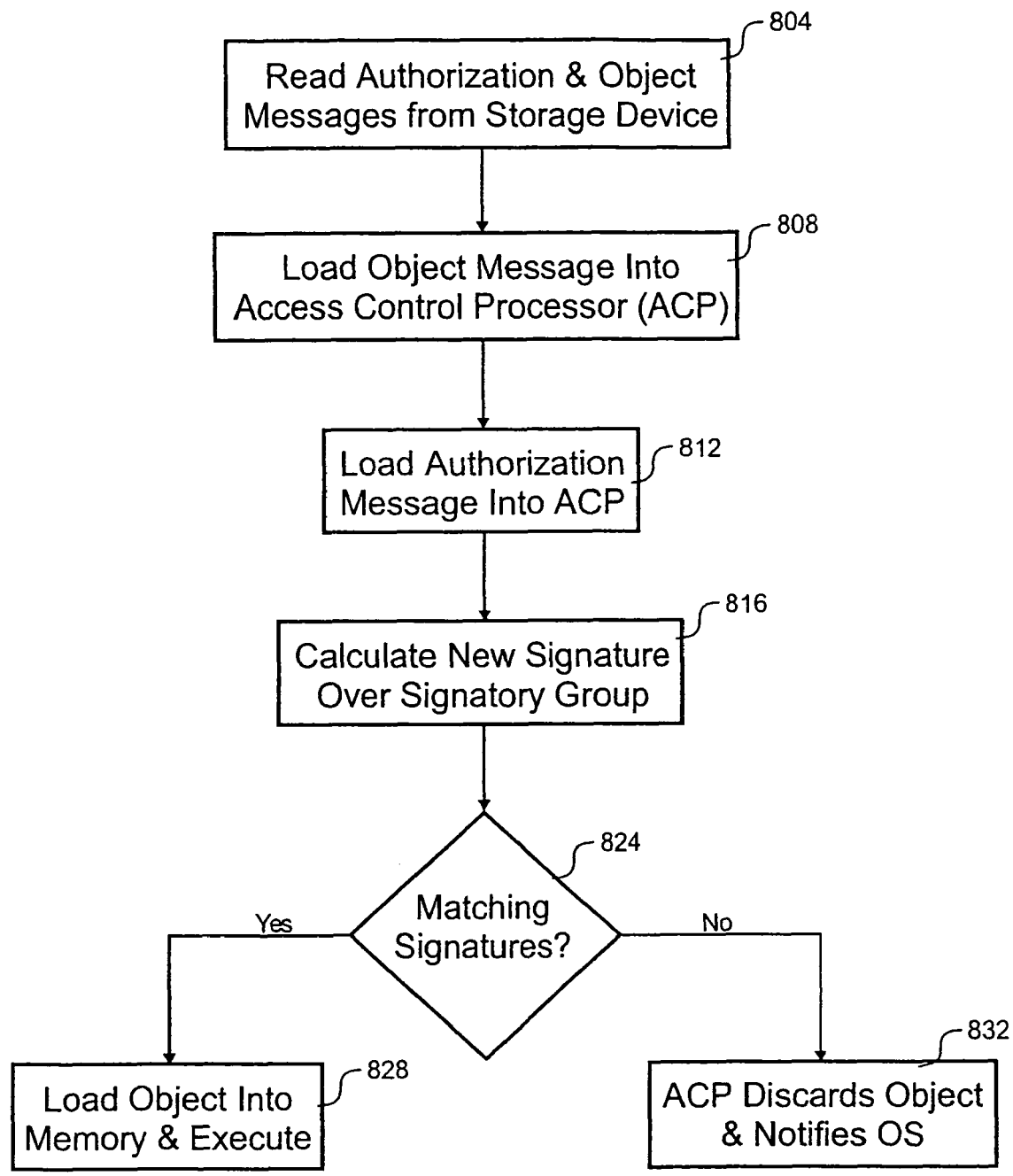
FIG. 8 is a flow diagram depicting an embodiment of a process for loading an object in a third security level.

Referring next to FIG. 8, an embodiment of a process for loading an object in a third security level is depicted. This embodiment authenticates the object before launch so that approval by the network operator is confirmed. In a first step 804, the controller 220 reads the authorization and object messages 500, 600 from the memory 228. The object message 600 is loaded into the ACP 240 in step 808 and the authorization message is loaded in step 812.

Once both object and authorization messages 600, 500 are loaded, all the components of the signatory group 700 are available to the ACP 240. Instep 816, the ACP 240 calculates the signature over the signatory group 700. The ACP 240 makes a determination in step 824 as to whether the signature 512 in the authorization message 500 matches the calculated signature. If there is a match, the object 608 is authorized and the object 608 is loaded into memory 228 by the OS and allowed to execute. Alternatively, the ACP 240 discards the object 608 and notifies the OS of an error if the signatures do not match. A signature 512 mismatch could result from corruption during storage, a pirate replacing the object 608 or a virus corrupting the object 608.

Figure 9:
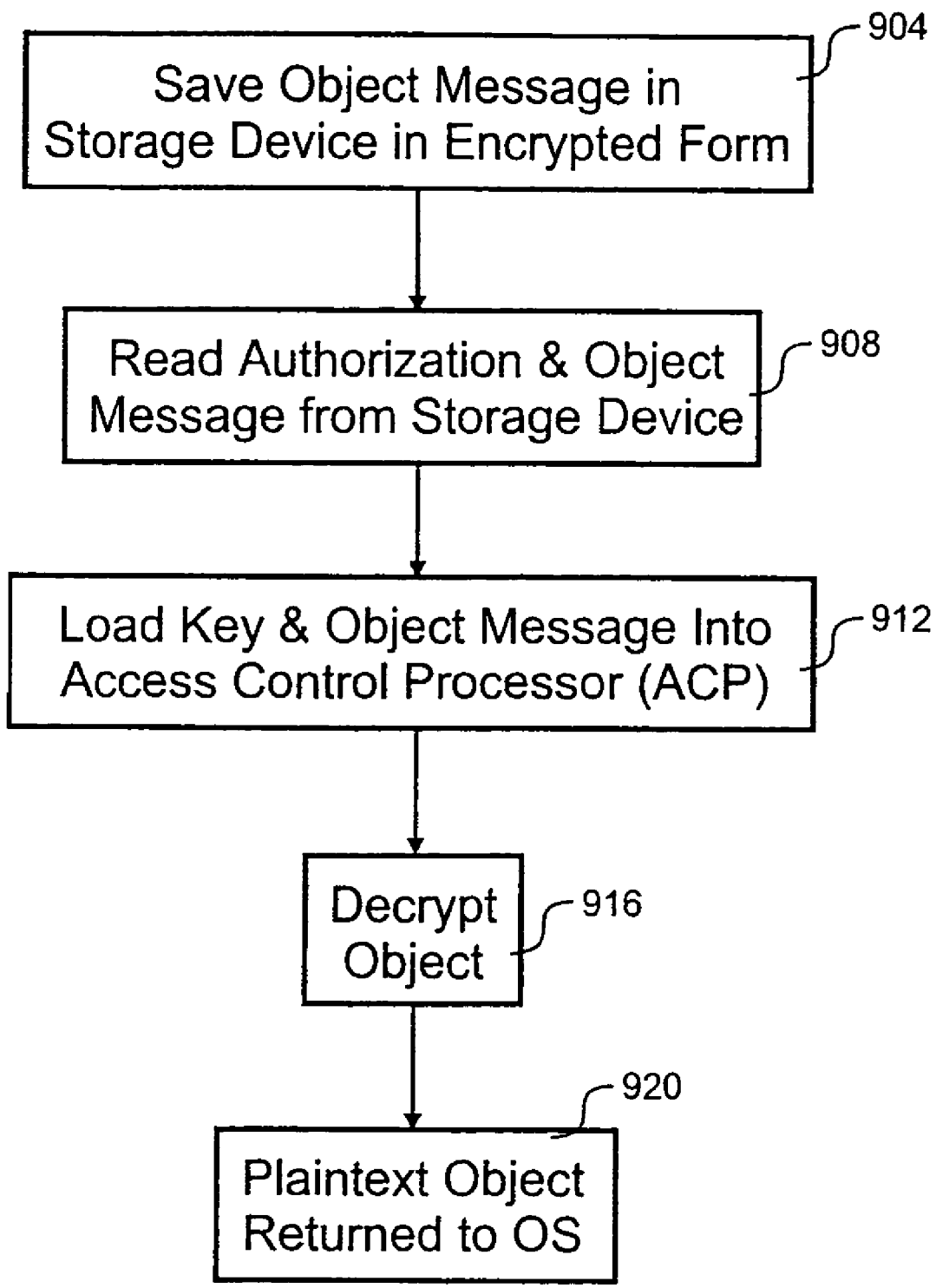
FIG. 9 is a flow diagram showing an embodiment of a process for loading an object in a fourth security level.

With reference to FIG. 9, a flow diagram of an embodiment of a process for loading an object in a fourth security level is shown. This embodiment checks for authorization prior to launching the object 608. Similar to level one security explained above, this embodiment uses encryption to achieve the authorization check. In a first step 904, the object message 600 is written to the memory 228 in encrypted form. In some embodiments, the object message 600 is received from the network 208 in encrypted form such that an additional encryption step would be unnecessary.

When loading the object 608 is desired, the authorization and object messages 500, 600 are retrieved from the memory 228 in step 908. The authorization message 500 includes a key necessary to decrypt the object message 600. The key and the object message 600 are loaded into the ACP in step 912. The object 608 is decrypted in step 916. If the key used for decryption is not the one that is authorized for the object 608 the decryption process will be unsuccessful and the resulting product will be undecipherable. Alternatively, the plaintext object is returned to the OS for execution if the key is correct in step 920.

Figure 10:
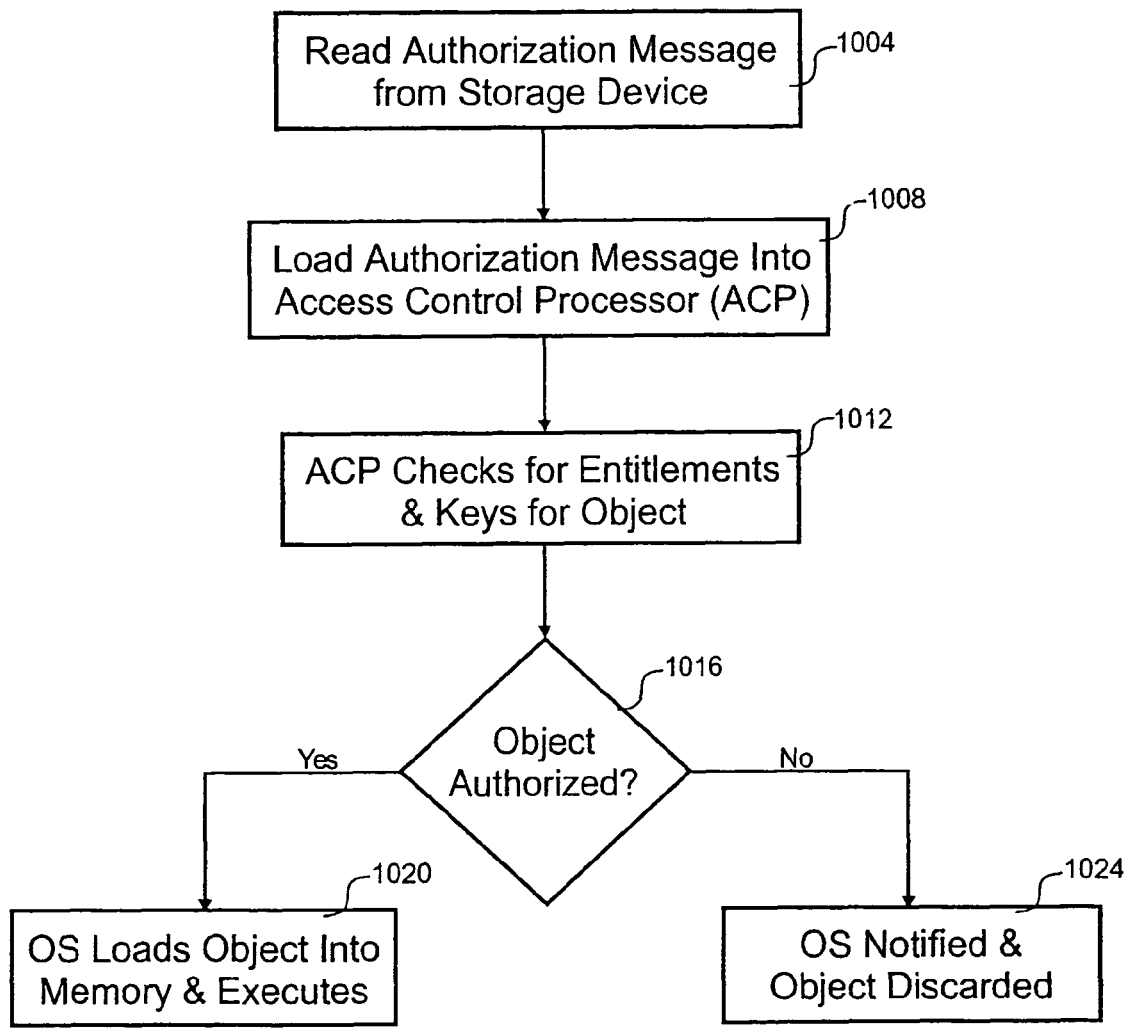
FIG. 10 is a flow diagram depicting another embodiment of a process for loading an object in the fourth security level.

Referring next to FIG. 10, a flow diagram of another embodiment of a process for loading an object in the fourth security level is illustrated. In this embodiment, entitlements in the authorization message 500 are checked in order to confirm the object 608 is authorized before it is loaded. In step 1004, the authorization message 500 is read from the memory 228. Next, the controller 220 loads the authorization message 500 into the ACP 240 in step 1008.

Once the ACP 240 has the authorization message 500, the entitlement information therein is checked in step 1012. A determination is made in step 1016 as to whether the object 608 is authorized by checking the entitlement information. If the object 608 is authorized, it is loaded into memory by the OS and executed. Alternatively, the OS is notified of a failed authorization attempt and object 608 is discarded in step 1024 if there is no entitlement to use the object 608.

Although not express above, the authorization of level four is typically performed coincident with the authentication of level three and before an object 608 is loaded, Authorization is performed prior to authentication because authorization is a quicker process. After the performance of authentication and authorization, the status returned to the OS is NOT AUTHORIZED, AUTHORIZED BUT NOT AUTHENTICATED, or AUTHORIZED AND AUTHENTICATED.

Figure 11:
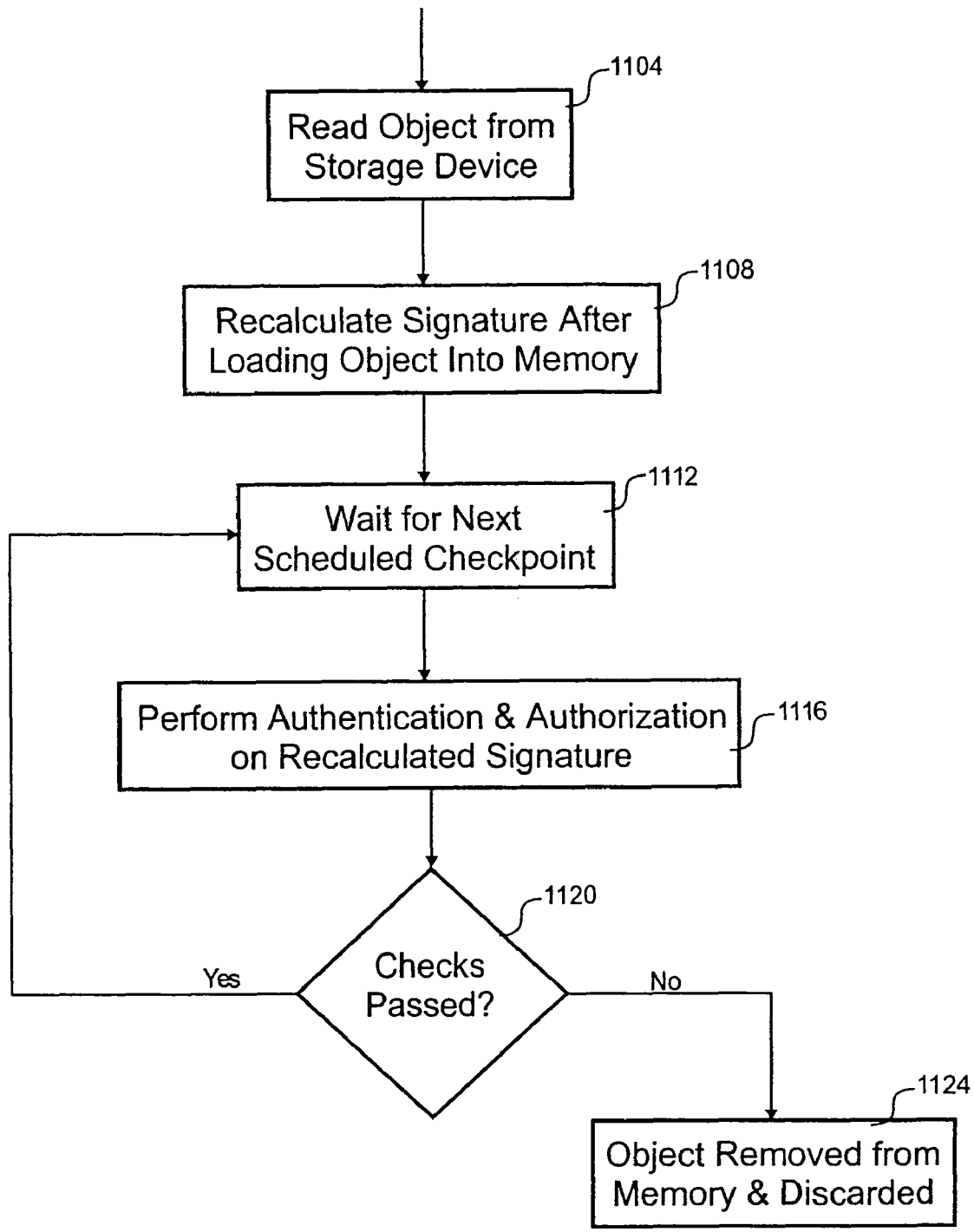
FIG. 11 is a flow diagram showing an embodiment of a process for checking continuously running objects in a fifth security level.

With reference to FIG. 11, a flow diagram of an embodiment of a process 20 for checking continuously running objects in a fifth security level is depicted. As can be appreciated, objects that are running should also be authenticated to be sure they haven't been replaced or modified. Additionally, verifying authorization periodically allows the expiration of an application that has been continuously running for a period of time. A predetermined period can be used or an unpredictably changing period can also be used.

The process begins in step 1104 where the object 608 is read from the memory 228. Before loading the object 608 it has a first signature, but after loading the object 608 into memory 228 the signature of the loaded object is different. As those skilled in the art appreciate, the addresses are translated from virtual addressing to physical addressing such that the signature changes. Accordingly, the signature is recalculated in step 1108 to produce a second signature indicative of the loaded object. It is noted, the object should be loaded and maintained in memory 228 in such a way that the second signature does not change. For example, the loaded object should not have self modifying code such that the signature would change.

The OS has checkpoints scheduled at regular intervals that trigger periodic authentication and authorization. In step 1112, the process waits for the next scheduled checkpoint. Typically, these scheduled checkpoints occur at least weekly or monthly. As cable TV services are paid monthly, checking for unauthorized continuously running applications after the billing cycle is desirable. Authentication and authorization is performed in step 1116 by loading the authorization message 500, loaded object and second signature into the ACP 240.

A determination is made in step 1120 as to whether the authentication and authorization performed in step 1116 were performed successfully. If successful, the process loops back to step 1112 where the process waits for the next checkpoint. Alternatively, the object is removed from memory 228 and discarded when either the authorization or authentication checks fail. Preferably, the ACP 240 is the time source for determining the scheduled checkpoints. The ACP 240 is less susceptible to attacks that set the clock back to avoid expiration of authorization. Additionally, the ACP 240 does not run application software that could change the time and requires secure commands to change the time. Secure commands could use encryption or signatures to guarantee authenticity of any time changes.

Figure 12:
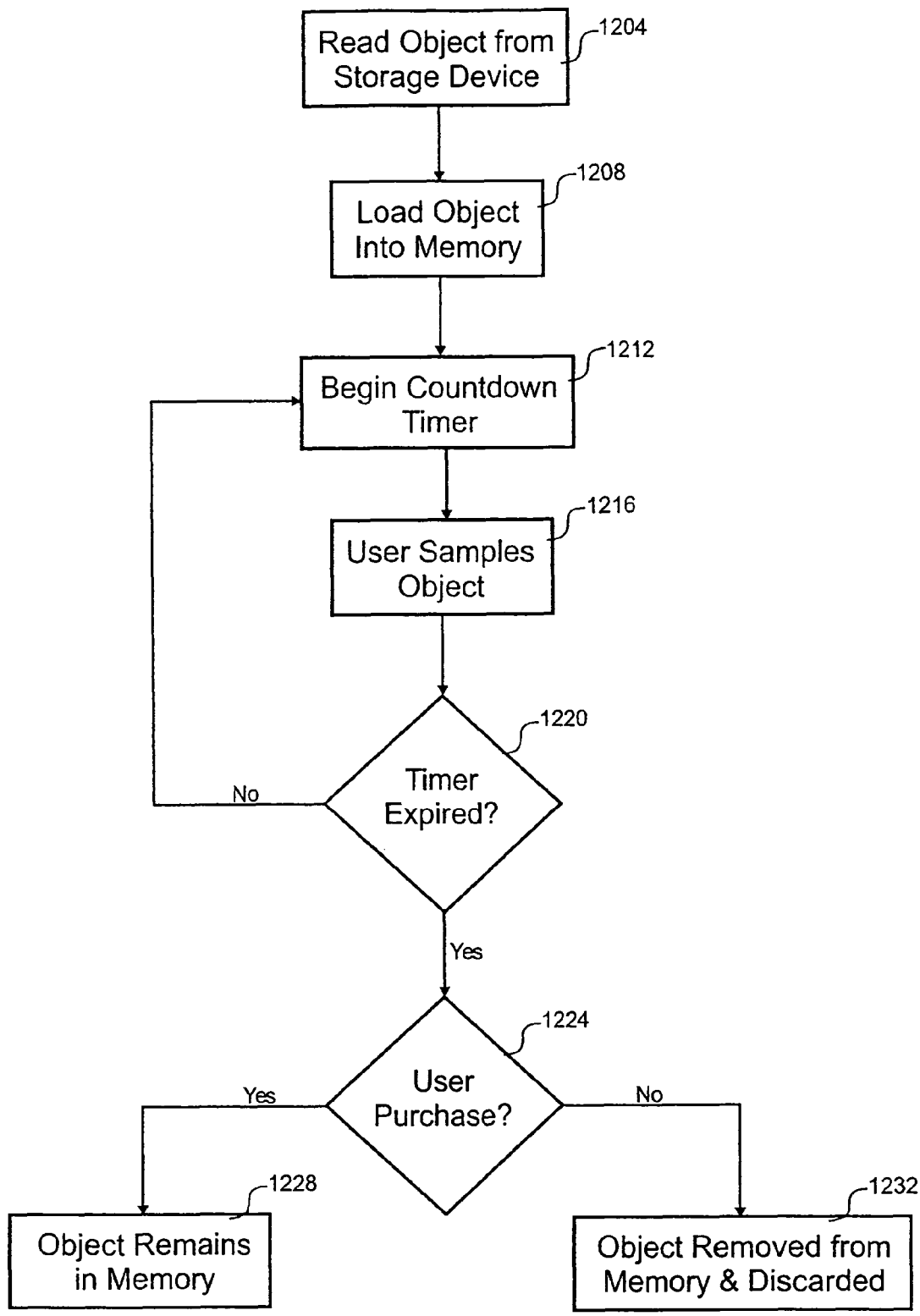
FIG. 12 is a flow diagram illustrating an embodiment of a process for allowing a free preview of an object in security level six.

Referring next to FIG. 12, a flow diagram of an embodiment of a process for allowing a free preview of an object is illustrated in security level six. As is well known in the art, users desire to try software before possibly purchasing it. Accordingly, the sixth level of security allows using the software for a period of time before a purchase is requested.

The process begins in step 1204 where the object 608 is retrieved from the memory 228. In step 1208, the object 608 is loaded into memory 228 where after execution is initiated. A countdown timer is begun in step 1212 that counts down to zero when the trial period ends. It is to be understood a count-up timer could also determine expiration of the trial period. The user samples the object 608 in step 1216 until the trial period ends. Completion of the sample period is determined in step 1220 by noting when the countdown timer reaches its lower bound or zero.

The user is given the option to purchase the object 608 in step 1224. A purchase screen is formulated and presented to the user by the set top box 108 to prompt purchase of the object 608. If no purchase is selected, the object 608 is removed from memory 228 and discarded in step 1232. Alternatively, the object remains in memory and the entitlement information is updated to reflect the purchase in step 1228. Other embodiments could use crippled demonstration software that can run forever, but is missing crucial features present in the purchased version. If the user likes the crippled version, the user is likely to purchase the full version to get the missing crucial features.

Figure 13:
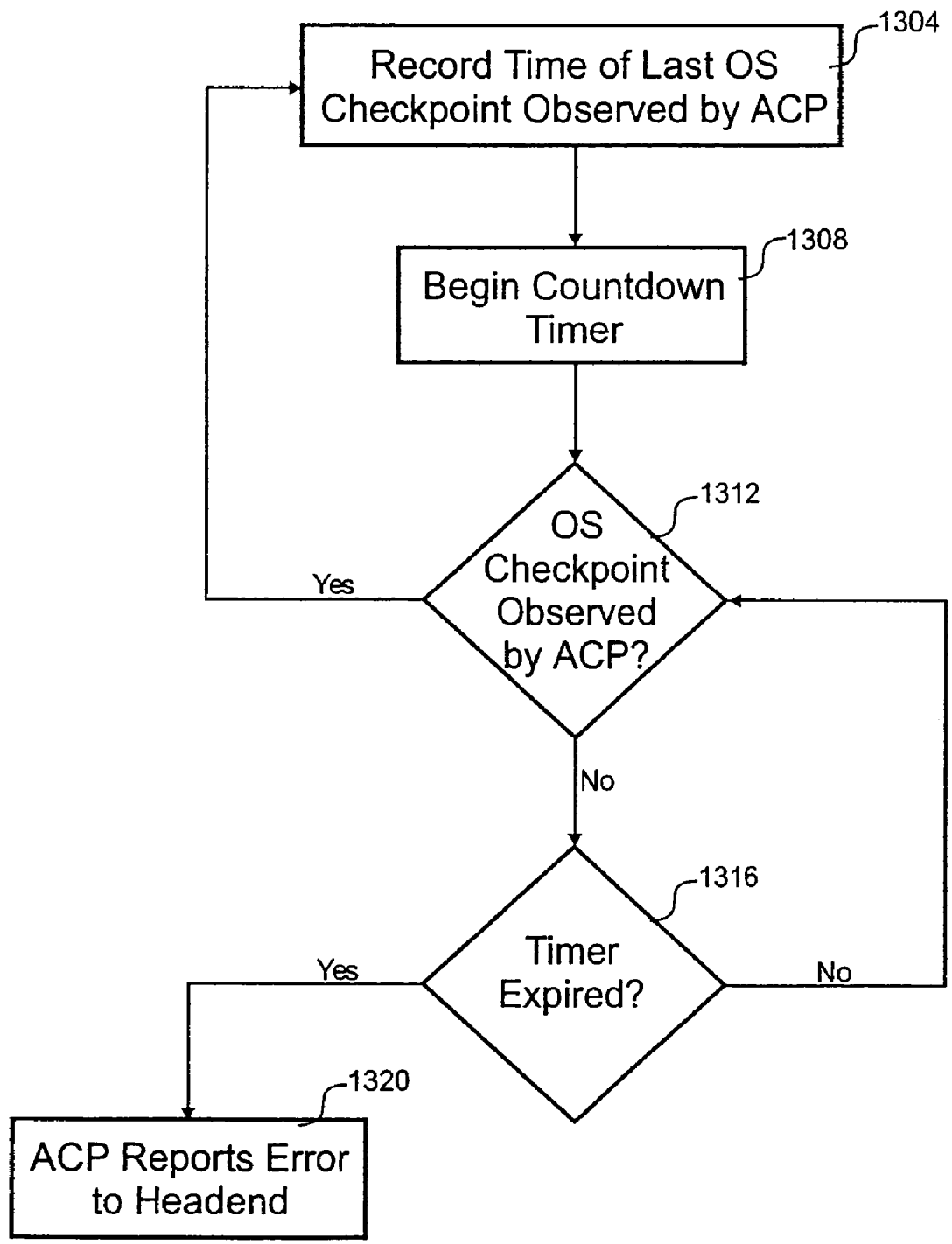
FIG. 13 is a flow diagram showing an embodiment of a process for monitoring security checks in security level seven.

With reference to FIG. 13, an embodiment of a process for monitoring security checks in security level seven is depicted in flow diagram form. In this embodiment the ACP 240 shadows the OS to double-check that checkpoints are encountered regularly. The process begins in step 1304 where the time of the last OS checkpoint is recorded. Checkpoints are the predetermined places in the OS or other software that cause confirmation of authentication and/or authorization confirmations. Since the ACP 240 is typically involved in the authentication and authorization process, the ACP 240 can track execution of checkpoints. In step 1308, the countdown timer is started. We note once again that this counter could also count-up rather than down.

In step 1312, a determination is made as to whether a checkpoint was observed by the ACP 240. If a checkpoint was observed, processing loops back to step 1304 where the countdown timer is reset so as to start again from the beginning. Alternatively, a check of the timer is performed in step 1316 if no checkpoint is observed. If the counter has not expired, processing loops back to step 1312 to test once again for the observation of a checkpoint. When the timer does expire without reaching a checkpoint, processing continues to step 1320 where the ACP 240 reports an error back to the headend 104.

Although the above embodiment discusses testing for checkpoints on a single object 608, it is to be understood that testing for checkpoints may occur for each object 608 in the set top box 108 in the manner described above. Custom criteria may be designed for each object 608 in order to detect errors in the execution of that object 608. Additionally, we note a trusted or secure operating system normally does not need an ACP 240 to check for aberrant behavior. To thwart hackers, pirates, viruses, and memory errors, checking for normal functioning of the operating system (i.e., check for regular checkpoints) adds an extra layer of security.

Figure 14:
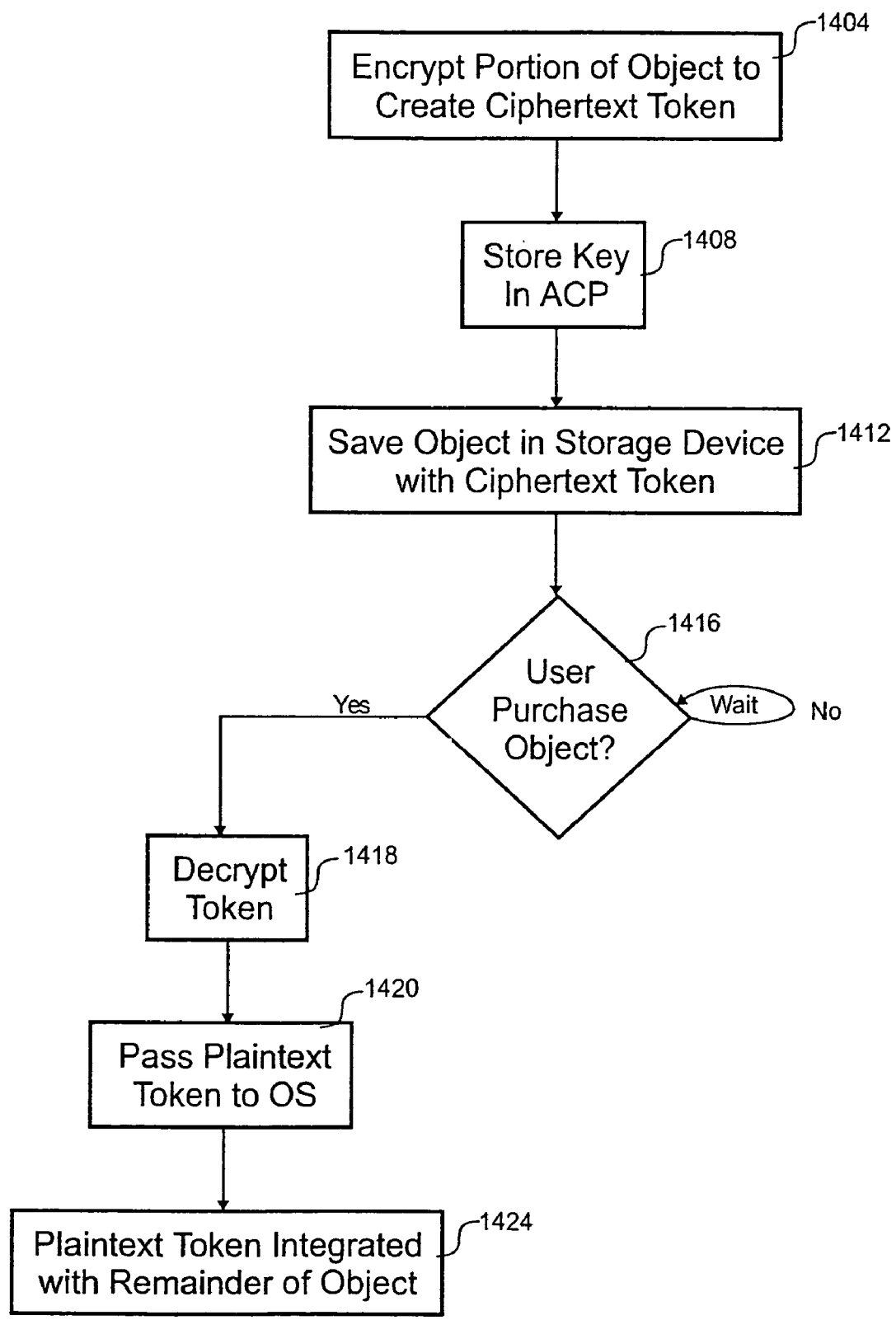
FIG. 14 is a flow diagram depicting an embodiment of a process for using execution tokens to achieve an eighth level of security.

Referring next to FIG. 14, a flow diagram of an embodiment of a process 30 for using tokens to achieve an eighth level of security is shown. This embodiment uses a ciphertext token to check authorization of an object 608. The ciphertext token is an encrypted portion of the object crucial to normal operation. Decryption of the ciphertext token produces a plaintext token that is inserted into the object 608 to allow proper execution.

In step 1404, the process begins by encrypting a portion of the object to create a ciphertext token. The key needed to decrypt the ciphertext token is stored in the ACP 240 and correlated to the object 608 in step 1408. The objects with embedded ciphertext tokens are written to the memory 228 in step 1412 where they wait for purchase. The process waits in step 1416 until the user purchases an object 608. In step 1418, the ciphertext token is removed from the object and sent to the ACP 240 for decryption. The resulting plaintext token is returned to the OS and integrated into the object 608 to make the object 608 functional in steps 1420 and 1424. By encrypting only a portion of the object 608 rather than the whole object 608, the decryption process is sped up.

The above discussion relates to running applications or objects 608 on an operating system. The concepts are equally applicable to Java™ applications running on a Java™ virtual machine (JVM). To aid in this abstraction, the concept of superordination and subordination are explained in relation to FIG. 15. Superordination and subordination define which object 608 has the responsibility to impose a checkpoint upon another object. Checkpoints are imposed on objects 608 during the normal interaction that occurs with other objects 608 and resources.

Figure 15:
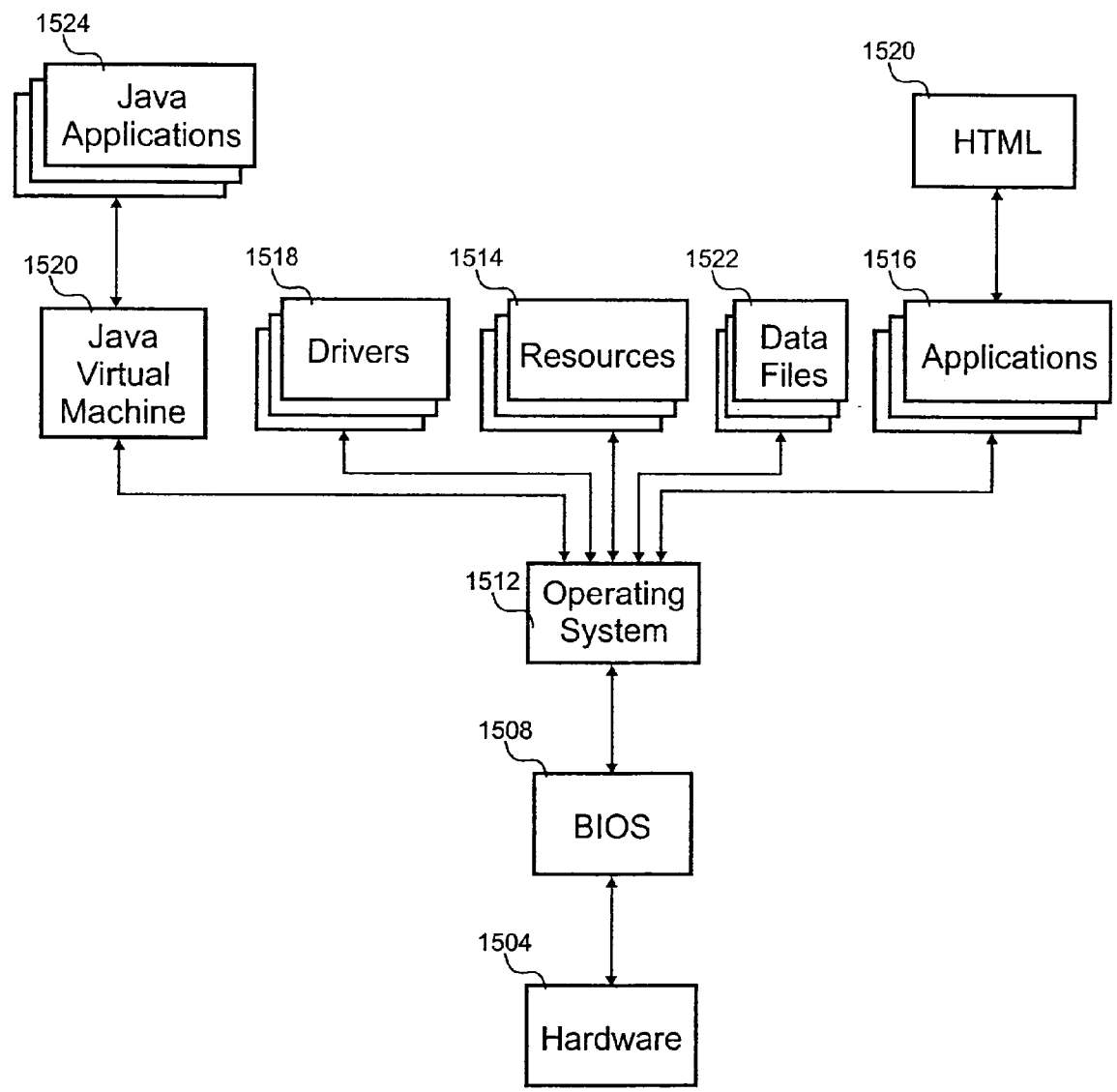
FIG. 15 is a block diagram showing the relationship between different objects in a set top box.

Referring specifically to FIG. 15, some of the objects 608 and resources in a set top box 108 are shown. Objects toward the bottom of FIG. 15 are superordinate to the objects near the top of FIG. 15. That is to say, objects toward the top of FIG. 15 are subordinate to those lower in the figure. Superordinate objects are responsible for imposing checkpoints on subordinate objects. For example, the hardware 1504 imposes checkpoints upon the BIOS 1508, 05 1512 and so on up the subordination hierarchy. The BIOS 1508 imposes checkpoints on the OS 1512, but not upon the hardware 1504. Objects in the same ordination stratum can impose a checkpoint on another object in that stratum when they interact. For example, an application 1516 can require execution of a checkpoint on a driver 1518.

Superordinate objects are designed to initiate execution of the checkpoints in conjunction with the ACP 240 and subordinate objects are designed to have checkpoints imposed upon them. For example, the BIOS 1508 requires execution of a checkpoint upon the OS 1512 during the boot process, during execution and/or periodically while running. A driver object 1518 is subject to checkpoints when installed or exercised during normal operation. Data file objects 1522 are subject to checkpoints whenever the data in the file is accessed. An HTML object 1528 is reviewed as part of a checkpoint whenever the HTML object 1528 is interpreted by a browser application 1516.

In light of the above description, a number of advantages of the present invention are readily apparent. Having multiple checkpoints that check authorization anchor authentication provides tighter security. With this added security, cable TV pirates are less likely to steal objects, viruses are less likely to go unnoticed and hackers are more likely to be detected.

A number of variations and modifications of the invention can also be used. For example, the above discussion talks of multiple levels of security. It is to be understood that the levels can be combined together to achieve the security goals of a particular system. Additionally, the above embodiments relate to cable TV providers, however, the principals are equally applicable to satellite TV systems, Internet service providers, computer systems, and other providers of content.

The above embodiments discuss several pricing methods for objects. Other embodiments could have one price on the first use and periodically require additional maintenance payments. Further, pricing could be per use with additional amounts per feature. For example, launching the email program is one price and printing each email adds art additional amount. Further still, videos could have a lifetime equal to just less than twice the running time to allow pausing and stopping playback, but not allow viewing the program two times. Video games could have a set lifetime of one hour or one day, for example.

Although the invention is described with reference to specific embodiments thereof, the embodiments are merely illustrative, and not limiting, of the invention, the scope of which is to be determined solely by the appended claims.

What is claimed is:

1. A method for authenticating and authorizing a specific portion of broadcast content within a conditional access broadcast network, the method comprising:
    receiving the specific portion of broadcast content with a receiver that is one of a plurality of receivers adapted to receive content via the conditional access broadcast network, wherein the specific portion of broadcast content is broadcast to and received by each receiver within the plurality of receivers, further wherein the specific portion includes a first portion including an object intended for the receiver and a second portion comprising an authorization message, the authorization message including a metadata related to the object;
    authenticating the specific portion of broadcast content wherein the authenticating comprises:
        calculating a code both from object data comprising the object and from authentication data comprising a first portion of the authorization message, wherein the first portion of the authorization message includes the metadata;
        comparing the code to a predetermined code received in the specific portion of the broadcast content, wherein the predetermined code is not included in the first portion of the authorization message, and wherein a second portion of the authorization message comprises the predetermined code; and determining, based on the comparing of the code to the predetermined code, whether the specific portion of the broadcast content is from a trusted source;

based on the authenticating, authorizing the specific portion of broadcast content for use by the receiver; and running a process that checks authorization for the receiver to use the received specific portion of broadcast content.

2. The method for authenticating and authorizing a specific portion of broadcast content of claim 1, the method further comprising:

detecting an event that triggers authorization of the receiver to use the received specific portion of broadcast content.

3. The method for authenticating and authorizing a specific portion of broadcast content of claim 2, wherein the event is at least one of:

an unpredictable period; or a predetermined period measured relative to loading the received specific portion of broadcast content.

4. The method for authenticating and authorizing a specific portion of broadcast content of claim 1, wherein authenticating the specific portion of broadcast content comprises decryption of at least a segment of the specific portion of broadcast content.

5. The method for authenticating and authorizing a specific portion of broadcast content of claim 1, wherein the specific portion of broadcast content comprises at least one of software, drivers, firmware, video, audio, and data.

6. The method for authenticating and authorizing a specific portion of broadcast content of claim 1, further comprising:

receiving first authorization information; and receiving second authorization information that replaces the first authorization information so as to extend authorization rights.

7. A non-transitory computer-readable storage medium comprising stored instructions for authenticating and authorizing a specific portion of broadcast content within a conditional access broadcast network, the instructions comprising steps for:

receiving the specific portion of broadcast content with a receiver that is one of a plurality of receivers adapted to receive content via the conditional access broadcast network, wherein the specific portion of broadcast content is broadcast to and received by each receiver within the plurality of receivers, further wherein the specific portion includes a first portion including an object intended for the receiver and a second portion comprising an authorization message, the authorization message including a metadata related to the object;

authenticating the specific portion of broadcast content wherein the authenticating comprises:

calculating a code both from object data comprising the object and from authentication data comprising a first portion of the authorization message, wherein the first portion of the authorization message includes the metadata;

comparing the code to a predetermined code received in the specific portion of the broadcast content, wherein the predetermined code is not included in the first portion of the authorization message, and wherein a second portion of the authorization message comprises the predetermined code; and determining, based on the comparing of the code to the predetermined code, whether the specific portion of the broadcast content is from a trusted source;

based on the authenticating, authorizing the specific portion of broadcast content for use by the receiver; and running a process that checks authorization for the receiver to use the received specific portion of broadcast content.

* * * * *